(12) United States Patent
Nakajima et al.

(10) Patent No.: US 8,263,199 B2
(45) Date of Patent: Sep. 11, 2012

(54) POLYIMIDE TUBE, METHOD FOR PRODUCTION THEREOF, METHOD FOR PRODUCTION OF POLYIMIDE VARNISH, AND FIXING BELT

(75) Inventors: Shingo Nakajima, Osaka (JP); Jun Sugawara, Osaka (JP); Akira Mizoguchi, Osaka (JP); Naoki Onmori, Sennan-gun (JP); Yoshimasa Suzuki, Sennan-gun (JP); Kazuhiro Kizawa, Sennan-gun (JP); Yusuke Uchiba, Sennan-gun (JP)

(73) Assignees: Sumitomo Electric Industries, Ltd., Osaka-shi, Osaka (JP); Sumitomo Electric Fine Polymer, Inc., Sennan-gun, Osaka (JP)

( * ) Notice: Subject to any disclaimer, the term of this patent is extended or adjusted under 35 U.S.C. 154(b) by 702 days.

(21) Appl. No.: 12/444,951

(22) PCT Filed: Oct. 5, 2007

(86) PCT No.: PCT/JP2007/069587
§ 371 (c)(1),
(2), (4) Date: Apr. 9, 2009

(87) PCT Pub. No.: WO2008/044643
PCT Pub. Date: Apr. 17, 2008

(65) Prior Publication Data
US 2010/0055365 A1 Mar. 4, 2010

(30) Foreign Application Priority Data
Oct. 11, 2006 (JP) .................... 2006-278016

(51) Int. Cl.
*B32B 1/08* (2006.01)
*B32B 27/00* (2006.01)

(52) U.S. Cl. .................... 428/36.9; 428/473.5
(58) Field of Classification Search .......... 428/395, 428/473.5, 34.1, 36.9
See application file for complete search history.

(56) References Cited

U.S. PATENT DOCUMENTS

| 5,182,606 A | 1/1993 | Yamamoto et al. |
| 6,818,290 B1 * | 11/2004 | Chopra et al. .............. 428/328 |
| 2008/0166563 A1 * | 7/2008 | Brittingham et al. ...... 428/411.1 |

FOREIGN PATENT DOCUMENTS

| EP | 0 996 040 | | 4/2000 |
| JP | 62-003980 | | 1/1987 |
| JP | 03-025478 | | 2/1991 |
| JP | 08-080580 | | 3/1996 |
| JP | 08080580 A | * | 3/1996 |
| JP | 2003-109429 | | 4/2003 |
| JP | 2003109429 A | * | 4/2003 |
| JP | 2004-123867 | | 4/2004 |
| JP | 2004-315761 | | 11/2004 |
| JP | 2005-150362 | | 6/2005 |
| JP | 2005-215028 | | 8/2005 |
| JP | 2006-321968 | | 11/2006 |

* cited by examiner

*Primary Examiner* — Rena Dye
*Assistant Examiner* — Susan R Dye
(74) *Attorney, Agent, or Firm* — Drinker Biddle & Reath LLP

(57) ABSTRACT

A polyimide tube composed of a polyimide resin composition in which 5 to 23.5 volume percent of boron nitride and 1 to 15 volume percent of an acicular substance are dispersed as a filler in a polyimide resin on the basis of the total volume of the composition, a method of producing the tube, a method of producing a polyimide varnish used for producing the tube, and a fixing belt including the tube as a base member are provided.

9 Claims, 2 Drawing Sheets

POLYIMIDE TUBE, METHOD FOR PRODUCTION THEREOF, METHOD FOR PRODUCTION OF POLYIMIDE VARNISH, AND FIXING BELT

TECHNICAL FIELD

The present invention relates to a polyimide tube, and more specifically, to a polyimide tube having a high thermal conductivity and a good tensile strength and modulus of elasticity. In addition, the present invention relates to a method of producing the polyimide tube, a polyimide varnish used for producing the polyimide tube, and a fixing belt including the polyimide tube as a belt base member.

BACKGROUND ART

In general, in image-forming apparatuses utilizing an electrophotographic method (including an electrostatic recording method), such as a copy machine, a facsimile, and a laser beam printer, an image-forming process includes an exposure step of performing an image exposure on a photosensitive member to form an electrostatic latent image; a development step of applying a toner (colored resin particles) to the electrostatic latent image to form a toner image; a transfer step of transferring the toner image onto a material to be transferred such as a recording sheet or an overhead projector (OHP) sheet; a fixing step of fixing the unfixed toner image on the material to be transferred by means of, for example, heating and pressing; a cleaning step of removing untransferred toner remaining on the photosensitive member; and the like.

A general fixing method is a method of fusion-bonding the unfixed toner image formed on a material to be transferred onto the material to be transferred by heating and pressing. As a method of heating and pressing, the following method has been employed. A fixing roller and a pressure roller are disposed so as to face each other, a material to be transferred having an unfixed toner image thereon is allowed to pass between the rollers, thereby pressing the material between the rollers and heating with the fixing roller including a heating source therein. The fixing roller has a structure in which a cylindrical metal core is used as a base member, the outer surface of the metal core is coated with a rubber or a resin having a good mold-releasing property, and a heating source such as an electric heater is disposed in the hollow part of the metal core. However, a fixing roller having such a structure requires a relatively long waiting time to increase the surface temperature of the fixing roller to a fixing temperature with the heating means disposed in the hollow part thereof.

On the other hand, as shown in FIG. 1, a method has been developed in which an unfixed toner image 5 formed on a material 4 to be transferred is fixed by heating using heating means (heater) 2 with a fixing belt 1 composed of a thin endless belt therebetween. More specifically, the heater 2 and a pressure roller 3 are disposed so as to face each other with the thin fixing belt 1 therebetween, and the material 4 to be transferred having the unfixed toner image 5 thereon is allowed to pass therethrough while heating with the heater 2. Thereby, the unfixed toner image 5 on the material 4 to be transferred is fusion-bonded on the material 4 to be transferred. The heater 2 is fixed, and the fixing belt 1 and the pressure roller 3 rotate in directions opposite to each other. A pressure roller having a structure in which a rubber layer and a fluorocarbon resin layer are arranged on a metal core in that order is generally used as the pressure roller 3. A method using a pressure belt instead of the pressure roller 3 has also been developed.

In the fixing method using a fixing belt, the unfixed toner image 5 on the material 4 to be transferred is heated using the heater 2 with the thin fixing belt 1 therebetween. Accordingly, the temperature of a fixing unit reaches a predetermined fixing temperature within a short time, and the waiting time after the starting of an electric power supply can be extremely decreased. In this fixing method, only a portion necessary for fixing is heated, and thus the electric power consumption is also small. The fixing belt used in this fixing method requires good heat resistance, mechanical strength, mold-releasing property, and the like.

In consideration of the above required performances, a fixing belt in which a polyimide tube functioning as an endless belt is used as a base member and a fluorocarbon resin layer is provided on the outer surface of the base member has been generally used. However, such a fixing belt including a polyimide tube as a base member is composed of a polyimide resin having a low thermal conductivity and a fluorocarbon resin. Accordingly, an improvement in a thermally conductive property has been desired in order to increase the fixing speed, to decrease the fixing temperature, and to further improve the fixing property of a full-color toner. In order to improve the thermally conductive property of the fixing belt, when the thickness of the polyimide tube is decreased, the mechanical strength thereof decreases. Consequently, for example, wrinkles, flattening, and cracking of the fixing belt are readily formed by rotations during fixing.

Japanese Unexamined Patent Application Publication No. 62-3980 (Patent Document 1) proposes an endless belt including an endless belt made of a polyimide resin, and an inner layer made of a polyimide resin composition containing a thermally conductive filler, the inner layer being disposed on an inner peripheral surface of the endless belt. However, in this endless belt, since the thermally conductive property of the endless belt made of the polyimide resin is insufficient, the improvement in the thermal conductivity in the thickness direction is not sufficient. In addition, since the endless belt requires a step of forming the inner layer, the cost increases.

Japanese Unexamined Patent Application Publication No. 3-25478 (Patent Document 2) discloses an endless film made of a resin composition in which an inorganic filler such as carbon black, silicon carbide, or silica is mixed with a polyimide resin. According to a fixing belt including the endless film as a base member, the fixing temperature can be decreased to a certain degree, but elongation of the fixing belt drastically decreases when the mixing ratio of the inorganic filler increases. Accordingly, Examples in Patent Document 2 disclose only endless-belt-shaped polyimide films prepared by incorporating carbon black, silicon carbide, or silica in a polyimide resin at a low mixing ratio in the range of 1 to 5 weight percent. However, when the mixing ratio of the inorganic filler to the polyimide resin is too low, it is difficult to sufficiently increase the thermal conductivity of the resulting polyimide tube.

Japanese Unexamined Patent Application Publication No. 8-80580 (Patent Document 3) discloses a fixing belt including, as a base member, a polyimide tube made of a resin composition in which an inorganic filler having a good thermally conductive property, such as boron nitride, is incorporated in a polyimide resin. Although Patent Document 3 discloses the mixing ratio of boron nitride over a wide range, in reality, it is necessary to incorporate boron nitride at a high ratio in order to obtain a fixing belt having a satisfactory thermally conductive property. When the content of the boron nitride in the polyimide resin is too low, the thermal conductivity of the fixing belt cannot be satisfactorily increased, and thus it is difficult to achieve required performances such as an increase in the fixing speed. In addition, when the content of the boron nitride in the polyimide resin is too low, the modulus of elasticity does not also sufficiently increase, and thus twist deformation of the fixing belt and flattening at an end of the fixing belt readily occur.

However, although an increase in the boron nitride content in the polyimide resin improves the thermal conductivity of the fixing belt, a mechanical strength such as the tensile strength significantly decreases. During fixing, the shape of a fixing belt is repeatedly changed in a portion that is in contact with a heater, and in addition, the fixing belt is rotated while both edges of the fixing belt are in contact with a holding jig. Therefore, when the tensile strength of the fixing belt is too low, breaking of the fixing belt and cracking at the edges of the belt readily occur. These problems become serious when both the tensile strength and the modulus of elasticity in tension of the fixing belt decrease.

Japanese Unexamined Patent Application Publication No. 2004-123867 (Patent Document 4) discloses a polyimide tubular product (polyimide tube) containing 0.1 to 100 parts by weight of carbon nanotube relative to 100 parts by weight of a polyimide resin and having a thermal conductivity of 0.30 W/m·K or more. Although Patent Document 4 discloses a mixing ratio of carbon nanotube over a very wide range, Examples in the patent document describe that a high mixing ratio of carbon nanotube in the range of 30 to 50 parts by weight is necessary in order to obtain a polyimide tube having a high thermal conductivity in the range of 0.50 to 0.55 W/m·K. However, as specifically described in Examples of Patent Document 4, when the mixing ratio of carbon nanotube is increased, a mechanical strength, such as the tear strength, of the polyimide tube significantly decreases.

Patent Document 1: Japanese Unexamined Patent Application Publication No. 62-3980
Patent Document 2: Japanese Unexamined Patent Application Publication No. 3-25478 (corresponding to the specification of U.S. Pat. No. 5,182,606)
Patent Document 3: Japanese Unexamined Patent Application Publication No. 8-80580
Patent Document 4: Japanese Unexamined Patent Application Publication No. 2004-123867

DISCLOSURE OF INVENTION

Problems to be Solved by the Invention

An object of the present invention is to provide a polyimide tube having a high thermal conductivity and a good tensile strength and modulus of elasticity. In particular, an object of the present invention is to provide a polyimide tube which has a high tensile strength and a modulus of elasticity at a high level and in which problems such as twist deformation and cracking and flattening at an end thereof do not readily occur when the polyimide tube is used as a base member of a fixing belt.

Another object of the present invention is to provide a method of producing a polyimide tube having the above good properties. Another object of the present invention is to provide a method of producing a polyimide varnish used for producing the polyimide tube.

Another object of the present invention is to provide a fixing belt which can realize an increase in the fixing speed, a decrease in the fixing temperature, and a significant improvement in, for example, the fixing property of a full-color toner and in which problems such as twist deformation, and cracking and flattening at an end of the belt do not readily occur by using the polyimide tube having the above good properties as a base member.

As a result of intensive studies carried out in order to achieve the above objects, the inventors of the present invention conceived a polyimide tube made of a polyimide resin composition in which boron nitride and an acicular substance (acicular filler) are dispersed as a filler in a polyimide resin at a specific ratio on the basis of the total volume of the composition. The polyimide tube of the present invention prevents the tensile strength from decreasing by decreasing the content of the boron nitride in a polyimide resin, and maintains the thermal conductivity and the modulus of elasticity at a high level by using the acicular substance in combination at a specific ratio.

Since the polyimide tube of the present invention contains boron nitride and an acicular substance at a specific ratio, the polyimide tube has high tensile strengths in the circumferential direction and in the axial direction and a high-level modulus of elasticity. Accordingly, for example, twist deformation of a fixing belt including the polyimide tube as a base member, and cracking and flattening at an end thereof are suppressed.

The polyimide tube of the present invention can be produced by a method (dipping method) of applying an organic solvent solution containing a polyimide precursor (polyimide varnish), boron nitride, and an acicular substance to a surface of a columnar or cylindrical metal mold by dipping; a method (dispensing method) of winding a polyimide varnish on the outer surface or the inner surface of a core body in a spiral manner using a dispenser to form a coating layer; or the like.

In particular, according to the latter dispensing method, the tensile strength in the circumferential direction can be increased by orienting boron nitride and an acicular substance in the circumferential direction. As described above, when a polyimide tube having high-level tensile strengths in the circumferential direction and in the axial direction and a high-level modulus of elasticity, and a particularly high mechanical strength in the circumferential direction is used as a base member of a fixing belt, a fixing belt in which twist deformation during driving, flattening due to buckling, and the like do not readily occur can be obtained.

The polyimide tube of the present invention is used as a belt base member, and a fluorocarbon resin layer is provided on the outer peripheral surface of the belt base member either directly or with an adhesive layer therebetween, thus obtaining a fixing belt installed in a fixing unit of an image-forming apparatus utilizing an electrophotographic method. These findings led to realization of the present invention.

Means for Solving the Problems

The present invention provides a polyimide tube composed of a polyimide resin composition in which 5 to 23.5 volume percent of boron nitride and 1 to 15 volume percent of an acicular substance are dispersed as a filler in a polyimide resin on the basis of the total volume of the composition.

In addition, the present invention provides a method of producing the above polyimide tube including a step of continuously supplying a polyimide varnish from a discharge opening of a supply portion of a dispenser, the discharge opening being in contact with an outer surface or an inner surface of a core body functioning as a forming metal mold, while rotating the core body; a step of winding the polyimide varnish on the outer surface or the inner surface of the core body in a spiral manner by relatively moving the supply portion of the dispenser in the rotation axis direction of the core body to form a coating layer, the step of winding and the step of continuously supplying the polyimide varnish being performed at the same time; a subsequent step of solidifying or curing the coating layer; and a subsequent step of detaching the coating layer from the core body, wherein the polyimide varnish contains, as solid components, a polyimide precursor and a filler composed of boron nitride and an acicular substance in an organic solvent, the content of the boron nitride is in the range of 5 to 23.5 volume percent, and the content of the acicular substance is in the range of 1 to 15 volume percent of the total volume of the solid components.

Furthermore, the present invention provides a method of producing a polyimide varnish wherein a filler is dispersed in a solution containing an organic solvent and a polyimide precursor, the filler contains boron nitride and an acicular substance, and the organic solvent is an organic amide solvent, the polyimide varnish being used for producing a polyimide tube, the method including steps 1 and 2:
(1) step 1 of mixing the acicular substance, a dispersing agent, and the organic amide solvent to prepare a dispersion liquid containing the acicular substance; and
(2) step 2 of mixing the dispersion liquid, the boron nitride, and the polyimide precursor.

Furthermore, the present invention provides a fixing belt including the above-described polyimide tube as a belt base member, wherein the fixing belt has a layer structure in which a fluorocarbon resin layer is provided on an outer peripheral surface of the belt base member either directly or with an adhesion layer therebetween.

Advantages

The present invention can provide a polyimide tube having a high thermal conductivity, and in addition, a good tensile strength and modulus of elasticity. The polyimide tube of the present invention has the above good properties, and thus, when the polyimide tube is used as a base member of a fixing belt, a fixing belt which can realize an increase in the fixing speed, a decrease in the fixing temperature, and a significant improvement in, for example, the fixing property of a full-color toner can be obtained.

The polyimide tube of the present invention has high tensile strengths in the circumferential direction and in the axial direction and a high-level modulus of elasticity. Accordingly, when the polyimide tube is used as a base member of a fixing belt, for example, twist deformation, and cracking and flattening at an end of the belt can be suppressed. According to the fixing belt including the polyimide tube of the present invention as a base member, cracking or breaking does not readily occur.

Figure 1:
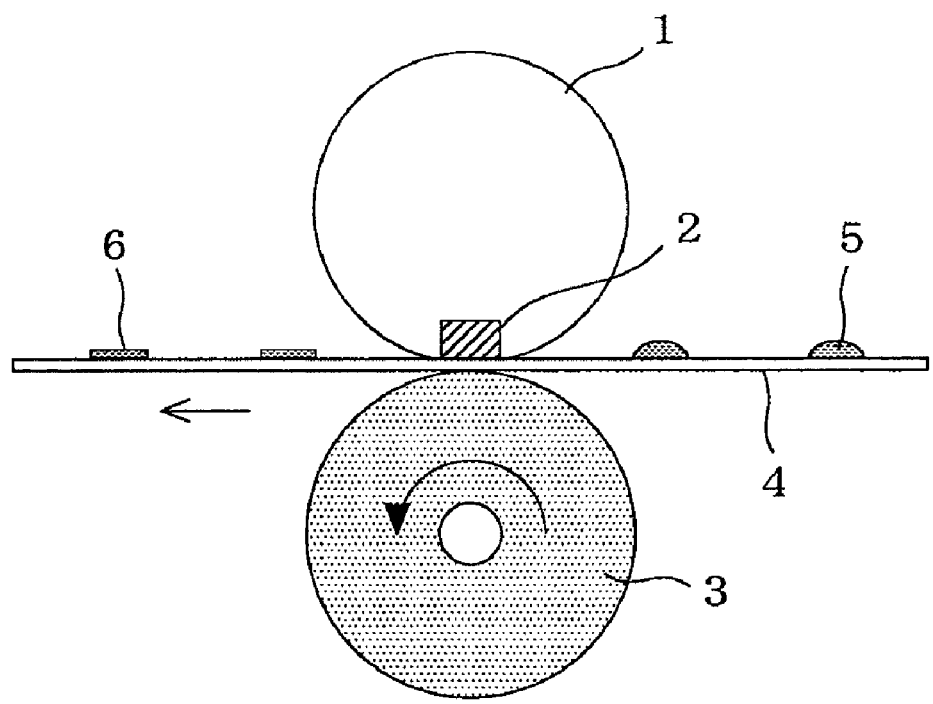
FIG. 1 is a view illustrating a fixing method using a fixing belt.

REFERENCE NUMERALS 1 fixing belt
2 heater
3 pressure roller
4 material to be transferred
5 unfixed toner image
6 fixed toner image
11 polyimide tube
12 adhesion layer
13 fluorocarbon resin layer
21 supply portion of a dispenser
22 discharge opening
23 polyimide varnish applied in a spiral manner
24 core body

BEST MODES FOR CARRYING OUT THE INVENTION

In the present invention, a thermosetting polyimide resin (also referred to as a "condensation polyimide resin") and a thermoplastic polyimide resin can be used as a polyimide resin. A polyimide tube of the present invention is preferably prepared from a thermosetting polyimide resin from the standpoint of heat resistance, tensile strength, modulus of elasticity, and the like.

A polyimide tube made of a thermosetting polyimide resin can be obtained by a method of applying an organic solvent solution (hereinafter referred to as a "polyimide varnish") of a polyimide precursor (also referred to as a "polyamide acid" or "polyamic acid") to the outer surface of a columnar metal mold or the outer surface or the inner surface of a cylindrical metal mold, drying, and then curing by heating.

The resulting coating layer of the polyimide precursor varnish is dried, and thermal curing (imidization) is then performed while the polyimide precursor tube is adhered to the surface of the metal mold. Alternatively, at the time when the polyimide precursor tube is solidified to the extent that the tube has a strength at which the structure as a tubular product can be maintained, the polyimide precursor tube is detached from the surface of the metal mold, and thermal curing is performed in the next step. When the polyimide precursor is heated to a maximum temperature in the range of 350° C. to 450° C., a polyamide acid undergoes dehydration ring-closure to form a polyimide.

As the thermosetting polyimide resin, a condensation wholly aromatic polyimide resin is preferable from the standpoint of heat resistance, mechanical strength, and the like. Examples of the thermosetting polyimide resin include resins prepared by conducting a polymerization reaction of an acid dianhydride such as pyromellitic dianhydride, 3,3',4,4'-diphenyltetracarboxylic dianhydride, or oxydiphthalic dianhydride with a diamine such as 4,4'-diaminodiphenyl ether, p-phenylenediamine, 4,4'-diaminobenzanilide, or resorcin oxydianiline in an organic solvent to synthesize a polyimide precursor, forming an organic solvent solution of the polyimide precursor (polyimide varnish) to have a tubular shape, and then performing dehydration ring-closure by heating. As such a polyimide varnish, in addition to a varnish that is uniquely synthesized, a commercially available polyimide varnish can also be used.

The thickness, the outer diameter, the length, and the like of the polyimide tube can be appropriately selected in accordance with a desired mechanical strength, application, and the like. In the case where the polyimide tube of the present invention is used as a base member of a fixing belt in an image-forming apparatus utilizing an electrophotographic method, the thickness of the polyimide tube is generally in the range of 30 to 80 μm, preferably in the range of 40 to 70 μm, and more preferably in the range of 50 to 60 μm, and the outer diameter thereof is generally in the range of 10 to 60 mm, and preferably in the range of 15 to 50 mm. The length of the polyimide tube can be appropriately determined in accordance with the size of a material to be transferred, e.g., copy paper.

The polyimide resin (imidized resin) used in the present invention may be a homopolymer or a copolymer. In the case where the polyimide resin is a homopolymer, the polyimide resin preferably has a chemical structure of a polyimide resin A having a repeating unit represented by formula (A):

[Chem. 1]

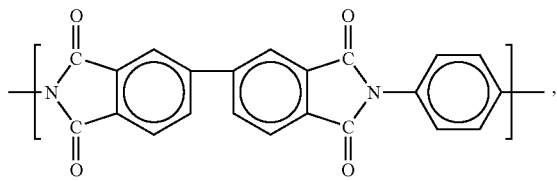
(A)

a polyimide resin B having a repeating unit represented by formula (B):

[Chem. 2]

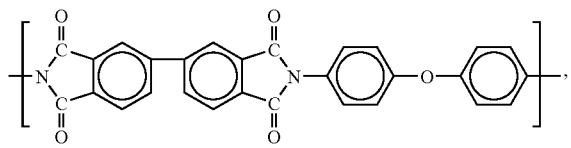
(B)

or a polyimide resin C having a repeating unit represented by formula (C):

[Chem. 3]

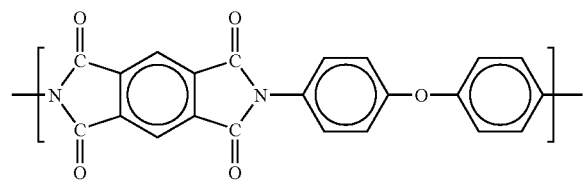
(C)

from the standpoint that the tensile strength of the resulting polyimide tube is highly balanced with the modulus of elasticity thereof.

These polyimide resins A to C can be used alone or as a mixture of two or more polyimide resins. These polyimide resins having the repeating units of A to C can be obtained by a method of forming a tube using polyimide precursors corresponding to the polyimide resins, and then performing imidization.

More specifically, in order to obtain the polyimide resin having the repeating unit A, a polyimide precursor is synthesized using 3,3',4,4'-diphenyltetracarboxylic dianhydride and p-phenylenediamine as monomers, a tube is formed using a polyimide varnish containing the polyimide precursor, and imidization is then performed. The acid dianhydride component and the diamine component are used in a substantially equimolar ratio (hereinafter the same).

In order to obtain the polyimide resin having the repeating unit B, a polyimide precursor is synthesized using 3,3',4,4'-diphenyltetracarboxylic dianhydride and 4,4'-diaminodiphenyl ether as monomers, a tube is formed using a polyimide varnish containing the polyimide precursor, and imidization is then performed.

In order to obtain the polyimide resin having the repeating unit C, a polyimide precursor is synthesized using pyromellitic dianhydride and 4,4'-diaminodiphenyl ether as monomers, a tube is formed using a polyimide varnish containing the polyimide precursor, and imidization is then performed.

The polyimide resins A to C can be used by blending two or more types of the polyimide resins. In such a case, blending is preferably performed by combining a polyimide resin having good rigidity with a polyimide resin having good flexibility. From this point of view, as regards blended resins, a blended resin composed of the polyimide resin A and the polyimide resin B, and a blended resin composed of the polyimide resin A and the polyimide resin C are preferable. In these blended resins, the proportion of the polyimide resin A is preferably in the range of 25 to 95 weight percent, and the proportion of the polyimide resin B or the polyimide resin C is preferably in the range of 5 to 75 weight percent.

In the case where the polyimide resin used in the present invention is a copolymer, the polyimide resin is preferably (1) a polyimide copolymer 1 having a repeating unit represented by formula (A):

[Chem. 4]

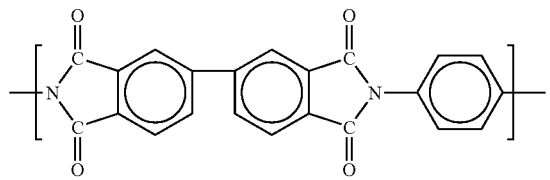
(A)

and a repeating unit represented by formula (B):

[Chem. 5]

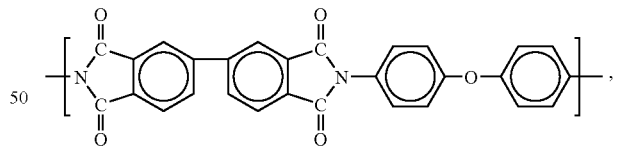
(B)

(2) a polyimide copolymer 2 having a repeating unit represented by formula (D):

[Chem. 6]

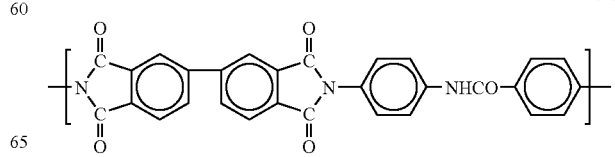
(D)

and a repeating unit represented by formula (B):

[Chem. 7]

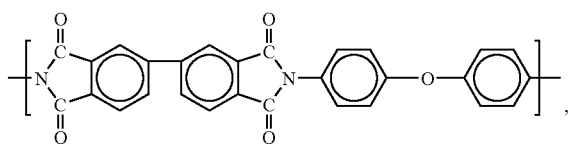

(B)

(3) a polyimide copolymer 3 having a repeating unit represented by formula (E):

[Chem. 8]

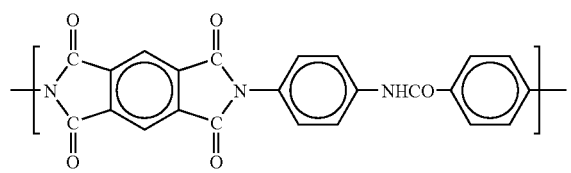

(E)

and a repeating unit represented by formula (C):

[Chem. 9]

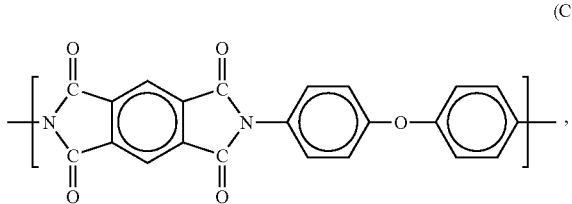

(C)

(4) a polyimide copolymer 4 having a repeating unit represented by formula (A):

[Chem. 10]

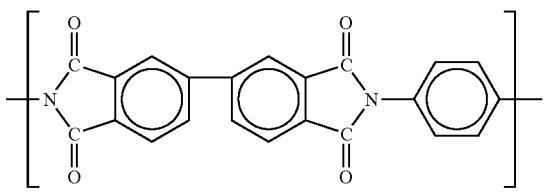

(A)

and a repeating unit represented by formula (F):

[Chem. 11]

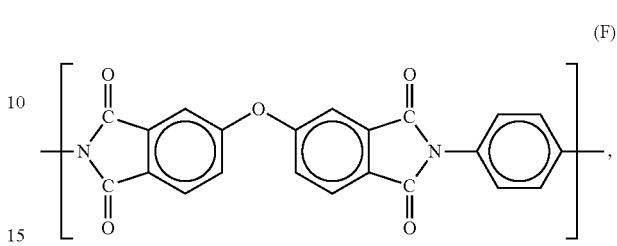

(F)

and (5) a polyimide copolymer 5 having a repeating unit represented by formula (A):

[Chem. 12]

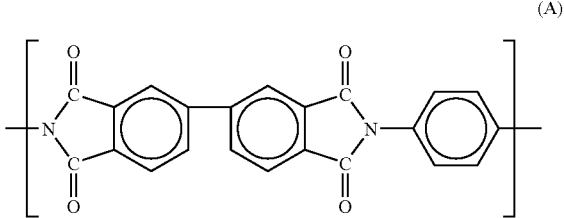

(A)

and a repeating unit represented by formula (G):

[Chem. 13]

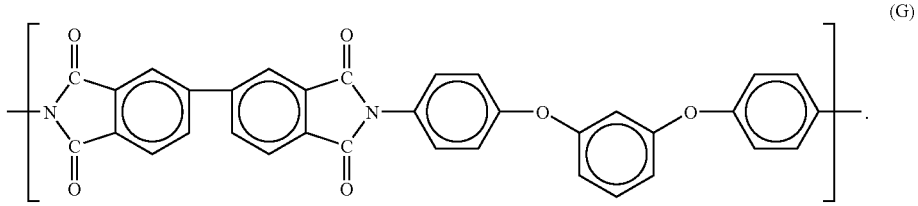

(G)

These polyimide copolymers 1 to 5 can be used alone or in combinations of two or more polyimide copolymers. These polyimide copolymers can be obtained by a method of forming a tube using polyimide precursors corresponding to the polyimide copolymers, and then performing imidization.

In order to obtain the polyimide copolymer 1 having the repeating unit represented by formula (A) and the repeating unit represented by formula (B), a polyimide precursor is synthesized using 3,3',4,4'-diphenyltetracarboxylic dianhydride, p-phenylenediamine, and 4,4'-diaminodiphenyl ether as monomers, a tube is formed using a polyimide varnish containing the polyimide precursor, and imidization is then performed. The ratio of the acid dianhydride component to the diamine component is a substantially equimolar ratio (hereinafter the same). From the standpoint that rigidity is highly balanced with flexibility, the proportion of the repeating unit (A) is preferably in the range of 25 to 99 mole percent, and the proportion of the repeating unit (B) is preferably in the range of 1 to 75 mole percent.

In order to obtain the polyimide copolymer 2 having the repeating unit represented by formula (D) and the repeating unit represented by formula (B), a polyimide precursor is synthesized using 3,3',4,4'-diphenyltetracarboxylic dianhydride, 4,4'-diaminobenzanilide, and p-phenylenediamine as monomers, a tube is formed using a polyimide varnish containing the polyimide precursor, and imidization is then performed. From the standpoint that rigidity is highly balanced with flexibility, the proportion of the repeating unit (D) is preferably in the range of 25 to 99 mole percent, and the proportion of the repeating unit (B) is preferably in the range of 1 to 75 mole percent.

In order to obtain the polyimide copolymer 3 having the repeating unit represented by formula (E) and the repeating unit represented by formula (C), a polyimide precursor is synthesized using 3,3',4,4'-diphenyltetracarboxylic dianhydride, 4,4'-diaminobenzanilide, and 4,4'-diaminodiphenyl ether as monomers, a tube is formed using a polyimide varnish containing the polyimide precursor, and imidization is then performed. From the standpoint that rigidity is highly balanced with flexibility, the proportion of the repeating unit (E) is preferably in the range of 25 to 99 mole percent, and the proportion of the repeating unit (C) is preferably in the range of 1 to 75 mole percent.

In order to obtain the polyimide copolymer 4 having the repeating unit represented by formula (A) and the repeating unit represented by formula (F), a polyimide precursor is synthesized using 3,3',4,4'-diphenyltetracarboxylic dianhydride, oxydiphthalic dianhydride, and p-phenylenediamine as monomers, a tube is formed using a polyimide varnish containing the polyimide precursor, and imidization is then performed. From the standpoint that rigidity is highly balanced with flexibility, the proportion of the repeating unit (A) is preferably in the range of 25 to 99 mole percent, and the proportion of the repeating unit (F) is preferably in the range of 1 to 75 mole percent.

In order to obtain the polyimide copolymer 5 having the repeating unit represented by formula (A) and the repeating unit represented by formula (G), a polyimide precursor is synthesized using 3,3',4,4'-diphenyltetracarboxylic dianhydride, p-phenylenediamine, and resorcin oxydianiline as monomers, a tube is formed using a polyimide varnish containing the polyimide precursor, and imidization is then performed. From the standpoint that rigidity is highly balanced with flexibility, the proportion of the repeating unit (A) is preferably in the range of 25 to 99 mole percent, and the proportion of the repeating unit (G) is preferably in the range of 1 to 75 mole percent.

In the case where the polyimide tube of the present invention is used as a base member of a fixing belt, a method of applying a dispersion liquid containing a fluorocarbon resin on the outer peripheral surface of the polyimide tube, and performing baking at a high temperature may be employed. The above-described polyimide resins, polyimide copolymers, and blended resins of these have heat resistance which is sufficient to withstand such a baking at a high temperature.

Known examples of boron nitride (hereinafter may be abbreviated as "BN") include hexagonal BM (h-BN) having a graphite structure and cubic BN (c-BN) having a cubic crystal structure. Either may be used in the present invention. These boron nitrides may be used alone or in combinations of two or more compounds. The true specific gravity of boron nitride is 2.26 g/cm$^3$.

The average particle diameter of the boron nitride measured by a laser scattering method is preferably in the range of 0.1 to 15 µm, and more preferably in the range of 0.5 to 10 µm. When the average particle diameter of the boron nitride is excessively small, the boron nitride particles readily aggregate, and thus it may be difficult for the particles to disperse in a polyimide resin. When the average particle diameter of the boron nitride is excessively large, in the case where the film thickness of a polyimide tube is decreased, the surface smoothness may be degraded.

The content of the boron nitride in a polyimide resin composition is in the range of 5 to 23.5 volume percent, and preferably in the range of 10 to 20 volume percent on the basis of the total volume of the composition. When the content of the boron nitride is excessively low, the thermal conductivity of the resulting polyimide tube and a fixing belt including the polyimide tube as a base member decreases. When the content of the boron nitride is excessively high, a mechanical strength such as the tensile strength decreases.

In the present invention, the term "polyimide resin composition" means a resin composition in which boron nitride and an acicular substance are dispersed in an imidized polyimide resin. In order to obtain a polyimide tube composed of such a polyimide resin composition, a tube is formed using a polyimide varnish prepared by adding boron nitride and the acicular substance in an organic solvent solution of a polyimide precursor corresponding to the polyimide resin (raw material polyimide varnish) at a predetermined mixing ratio, and imidization is then performed.

In order to increase the dispersibility in the polyimide varnish and an adhesion property with the polyimide resin, boron nitride may be treated with a surface treatment agent such as a coupling agent. As the coupling agent, a known silane coupling agent or titanate coupling agent can be used.

The term "acicular substance" used in the present invention typically means an acicular filler. Specifically, the acicular substance means a fibrous substance such as carbon nanotube or a substance composed of a fine needle crystal (whisker). Specific examples of the acicular substance include carbon nanotube, titanium oxide, zinc oxide, potassium titanate, aluminum borate, silicon carbide, silicon nitride, magnesium sulfate, calcium silicate, calcium carbonate, and graphite. These acicular substances can be used alone or in combinations of two or more substances. Among these, carbon nanotube is preferable from the standpoint of the thermal conductivity.

The length and the diameter of the acicular substance are not particularly limited. However, considering a step of applying a polyimide precursor solution and the thickness of the resulting coating film, in general, the length is preferably in the range of about 0.1 to 200 µm, and the diameter is preferably in the range of about 0.01 to 10 µm. The length of the acicular substance is more preferably in the range of 0.5 to 50 µm. The diameter of the acicular substance is more preferably in the range of 0.05 to 5 µm. The acicular substances can be used alone or in combinations of two or more substances.

The term "carbon nanotube" (hereinafter may be abbreviated as "CNT") used as the acicular substance in the present invention means a substance having a tubular shape obtained by winding a single sheet of graphite (may be referred to as "graphene" or "graphene sheet"). Examples thereof also include a carbon nanofiber having a fiber diameter of 1 µm or less and carbon nanotube in which a plurality of carbon materials each having a shape of cup without a bottom overlap. The method of producing carbon nanotube is not particularly limited. However, carbon nanotube produced by a vapor-phase growth method, by which the diameter of carbon nanotube can be easily controlled and which is satisfactory in terms of mass productivity, is preferred.

The diameter of carbon nanotube is generally 300 nm or less, and preferably 200 nm or less. The length of carbon nanotube is generally 50 µm or less, preferably 30 µm or less, and more preferably 20 µm or less. The diameter and the length can be measured by a laser scattering method or with a scanning electron microscope. When the diameter and the length of carbon nanotube are excessively large, the dispersibility in a polyimide varnish tends to decrease. When the diameter and the length of carbon nanotube are excessively small, the mechanical strength may be decreased or the surface smoothness may be degraded.

The content of the carbon nanotube in the polyimide resin composition is in the range of 1 to 15 volume percent, preferably in the range of 2 to 10 volume percent, and more preferably in the range of 2 to 5 volume percent on the basis of the total volume of the composition. When the content of the carbon nanotube is excessively low, the thermal conductivities of the resulting polyimide tube and a fixing belt including the polyimide tube as a base member decrease, and an effect achieved by using boron nitride in combination decreases. When the content of the carbon nanotube is excessively high, the mechanical strength may decrease. As needed, carbon nanotube may be treated with a surface treatment agent described above.

From the standpoint that properties such as the thermal conductivity, the tensile strength, and the modulus of elasticity are highly balanced, the polyimide resin composition is preferably a composition in which boron nitride and an acicular substance such as carbon nanotube are dispersed in the polyimide resin in amounts by volume percent satisfying the relationship represented by formula (I):

$$15 \leq x+3y \leq 55 \quad (1)$$

wherein x represents the volume percent of the boron nitride, and y represents the volume percent of the acicular substance.

From the standpoint that properties such as the thermal conductivity, the tensile strength, and the modulus of elasticity are more highly balanced, the polyimide resin composition is more preferably a composition in which boron nitride and an acicular substance are dispersed in the polyimide resin in amounts by volume percent satisfying the relationship represented by formula (2):

$$20 \leq x+3y \leq 45 \quad (2)$$

wherein x represents the volume percent of the boron nitride, and y represents the volume percent of the acicular substance.

When the above value (x+3y) is excessively small, the thermal conductivity tends to decrease. When the above value (x+3y) is excessively large, the tensile strength tends to decrease. These relational formulae (1) and (2) are empirical formulae that are made on the basis of experimental results.

The polyimide tube can be obtained by a method of applying a polyimide varnish containing a polyimide precursor, boron nitride, and an acicular substance to the outer surface of a columnar metal mold or the outer surface or the inner surface of a cylindrical metal mold, drying, and then curing by heating. A coating layer of the polyimide varnish is dried, and thermal curing is then performed while the resulting tube containing the polyimide precursor is adhered to the surface of the metal mold. Alternatively, at the time when the polyimide precursor tube is solidified to the extent that the tube has a strength at which the structure as a tubular product can be maintained, the polyimide precursor tube is detached from the metal mold, and thermal curing is then performed. When the polyimide precursor is heated to a maximum temperature in the range of 350° C. to 450° C., a polyamide acid undergoes dehydration ring-closure to form a polyimide. Various types of additives such as another inorganic filler may be added to the polyimide varnish according to need so long as the objects of the present invention are not impaired.

The method of applying a polyimide varnish is not particularly limited. An example thereof is a method of applying a polyimide varnish to the outer surface of a columnar or cylindrical metal mold by a dipping method, and then allowing the metal mold to pass through a die disposed outside the metal mold, the die having an inner diameter larger than the outer diameter of the metal mold, to form a coating film having a desired thickness. Alternatively, the polyimide varnish may be applied to the inner surface of a cylindrical metal mold, and the metal mold may be allowed to pass through a die having an inner diameter smaller than the inner diameter of the metal mold to form a coating film having a desired thickness.

It is preferable that the polyimide tube of the present invention have a high mechanical strength in the circumferential direction. This is because when the polyimide tube is used as a base member of a fixing belt, twist deformation of the fixing belt, flattening due to buckling, and the like can be effectively suppressed. In order to in crease the mechanical strength in the circumferential direction, it is preferable that boron nitride and the acicular substance be oriented in the circumferential direction.

In order to orient boron nitride and the acicular substance in the circumferential direction, it is preferable to employ an application method using a dispenser (dispensing method). An example of the application method using a dispenser is a method described in Japanese Unexamined Patent Application Publication No. 2004-195989.

More specifically, the dispensing method is a method of producing a polyimide tube including a step of continuously supplying a polyimide varnish from a discharge opening of a supply portion of a dispenser, the discharge opening being in contact with an outer surface or an inner surface of a core body functioning as a forming metal mold, while rotating the core body; a step of winding the polyimide varnish on the outer surface or the inner surface of the core body in a spiral manner by relatively moving the supply portion of the dispenser in the rotation axis direction of the core body to form a coating layer, the step of winding and the step of continuously supplying the polyimide varnish being performed at the same time; a subsequent step of solidifying or curing the coating layer; and a subsequent step of detaching the coating layer from the core body.

Figure 4:
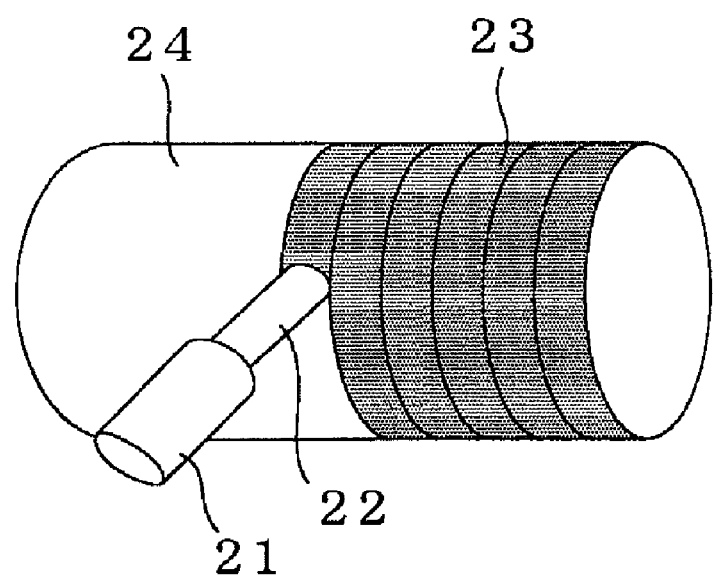
FIG. 4 is a view illustrating a method of applying a polyimide varnish using a dispensing method.

FIG. 4 is a view illustrating the dispensing method. As shown in FIG. 4, a polyimide varnish is continuously supplied from a supply portion 21 of a dispenser, while rotating a columnar or cylindrical core body 24 in the circumferential direction. A discharge opening 22 of the supply portion 21 is brought into contact with the outer surface of the core body 24. In the case where a cylindrical core body is used, the polyimide varnish may be supplied while the discharge opening 22 of the supply portion 21 of the dispenser is in contact with the inner surface of the core body.

When the polyimide varnish is continuously supplied from the discharge opening 22 of the supply portion 21 of the dispenser and the supply portion 21 is relatively removed in the rotation axis direction of the core body, the supplied polyimide varnish is wound in a spiral manner to form a coating layer 23. In general, the supply portion 21 of the dispenser is moved in the rotation axis direction of the core body 24. Alternatively, the core body 24 may be moved in the rotation axis direction relative to the supply portion 21 of the dispenser while the core body 24 is rotated. Adjacent portions of the polyimide varnish wound in a spiral manner are combined to form a uniform coating layer. The discharge opening 22 of the supply portion of the dispenser is generally a nozzle.

The moving speed of the dispenser and the rotational speed of the core body 24 are adjusted such that adjacent portions of the polyimide varnish applied by being wound in a spiral manner contact each other to form a uniform coating layer, thus applying the polyimide varnish on the surface of the core body 24 without clearance. After this application step, the applied polyimide varnish is thermally cured (imidized) by a conventional method, thereby forming a strong thin tubular film. Subsequently, by detaching the tube from the core body, a polyimide tube can be obtained. Alternatively, after the application step, a tube composed of the coating layer that is not completely imidized but is solidified to the extent that the coating layer has at least a strength at which the structure as a tube can be maintained may be detached from the core body, and the detached tube may then be thermally cured (imidized).

As the polyimide varnish, a polyimide varnish which contains, as solid components, a polyimide precursor, boron nitride, and an acicular substance in an organic solvent, and in which the content of the boron nitride is in the range of 5 to 23.5 volume percent and the content of the acicular substance is in the range of 1 to 15 volume percent of the total volume of the solid components is used. The viscosity of the polyimide varnish at 25° C. is preferably in the range of 100 to 15,000 poise (10 to 1,500 Pa·s), and more preferably in the range of 100 to 3,000 poise (10 to 300 Pa·s).

When the viscosity of the polyimide varnish is excessively high, portions of the polyimide varnish applied by being wound in a spiral manner, the portions contacting each other to be combined, have a thickness smaller than that of the other portions, resulting in the formation of irregularities on the surface of the coating layer. When the viscosity of the polyimide varnish is excessively low, dripping or repelling of the varnish occurs during application or drying, resulting in a difficulty in the formation of the tube. By adjusting the viscosity of the polyimide varnish, dripping or repelling of the varnish does not occur, and in addition, after the application, the applied liquid is moved by the gravity or a centrifugal force, thereby smoothening the liquid surface. Consequently, a flat coating layer without irregularities can be formed. In order to reliably prevent dripping, repelling, and formation of irregularities, the viscosity of the polyimide varnish used is preferably in the range of 100 to 3,000 poise.

The shape of the core body used is preferably a columnar shape or a cylindrical shape. Examples of the material of the core body used in the present invention include metals such as aluminum, aluminum alloys, iron, and stainless steels; ceramics such as alumina and silicon carbide; and heat-resistant resins such as polyimides, polyamide-imides, polybenzimidazole, and polybenzoxazole.

In order to improve the mold-releasing property of the core body, preferably, a mold-releasing agent containing silicone oil or the like is applied or the core body is coated with a ceramic. Examples of the ceramic include silica, alumina, zirconia, and silicon nitride coated by a sol-gel method; alumina and zirconia coated by a thermal spraying method; and aluminum nitride coated by a sputtering method. Among these, a ceramic coating by the sol-gel method, which does not require an expensive apparatus and in which the coating operation can be easily performed, is preferable.

In some cases, a portion having a slightly deep color is formed along a spiral application path, thereby forming a striped pattern. In a worse case, a portion having a deep color and a portion having a light color have different thicknesses, resulting in the formation of irregularities of the resulting coating film. The formation of the striped pattern can be prevented as follows: When the discharge opening of the supply portion of the dispenser is in contact with a polyimide varnish layer applied to the core body in a spiral manner, and the application is performed under the condition that the moving speed V (mm/sec) and the number of rotations R (rotations/sec) of the core body are represented by a relational expression of (V/R)<3.0 (mm/the number of rotations), the formation of striped pattern and irregularities can be prevented by, for example, a mixing effect of a liquid near the discharge opening of the liquid. This relational expression is preferably (V/R)<1.5 (mm/the number of rotations).

A plastic tube, a rubber tube, a metal tube, or the like can be used as the discharge opening of the supply portion of the dispenser. Among these, in particular, a tube made of polytetrafluoroethylene (PTFE) or a tetrafluoroethylene/perfluoroalkyl vinyl ether copolymer (PFA) is preferable because such a tube has an appropriate rigidity, and scratches are not readily formed on the surface of the core body.

The polyimide varnish used for producing a polyimide tube can be prepared by mixing components. For example, the polyimide varnish can be prepared by a method of adding boron nitride and an acicular substance to a polyimide varnish, performing a preliminary stirring with a stirrer, mixing the resulting mixture with a roll mill, and then performing vacuum degassing.

In order to increase the dispersibility of the acicular substance such as carbon nanotube, the following method of producing a polyimide varnish is preferably employed.

In a method of producing a polyimide varnish in which a filler is dispersed in a solution containing an organic solvent and a polyimide precursor, the polyimide varnish being used for producing a polyimide tube, the filler contains boron nitride and an acicular substance, the organic solvent is an organic amide solvent, and the method includes steps 1 and 2:

(1) step 1 of mixing the acicular substance, a dispersing agent, and the organic amide solvent to prepare a dispersion liquid containing the acicular substance; and (2) step 2 of mixing the dispersion liquid, the boron nitride, and a solution of the polyimide precursor.

Examples of the organic amide solvent include N-alkylpyrrolidone compounds and N-cycloalkylpyrrolidone compounds such as N-methyl-2-pyrrolidone, N-cyclohexyl-2-pyrrolidone, and N-methyl-ε-caprolactam; amide compounds such as N,N-dimethylformamide and N,N-dimethylacetamide; N,N-dialkylimidazolidinone compounds such as 1,3-dialkyl-2-imidazolidinone; tetraalkylurea compounds such as tetramethylurea; and hexaalkylphosphoric triamide compounds such as hexamethylphosphoric triamide. Among these, N-methyl-2-pyrrolidone is preferable.

Various types of dispersion stabilizers can be used as the dispersing agent as long as the dispersion stabilizers have a function of increasing dispersion stability of particles such as a filler. Examples of such a dispersing agent include not only commercially available dispersing agents but also various types of surfactants.

Among dispersing agents, from the standpoint of dispersibility and dispersion stability, macromolecular dispersing agents are preferable. The macromolecular dispersing agents include oligomer dispersing agents having a low molecular weight to dispersing agents having a high molecular weight. The number-average molecular weight of the macromolecular dispersing agents (measured by gel permeation chromatography (GPC)) is preferably in the range of 1,000 to 500,000.

Examples of the macromolecular dispersing agents include AJISPER PB-711 and AJISPER PB-821 (each of which is a copolymer containing a basic functional group) produced by Ajinomoto Fine-Techno Co., Inc.; DISPERBYK-161, DISPERBYK-163, and DISPERBYK-164, and DISPERBYK-182 (each of which is a block copolymer) produced by BYK Chemie Gmbh; and polyvinylpyrrolidone K-30 (K-value=27.0 to 33.0), polyvinylpyrrolidone K-85 (K-value=84.0 to 88.0), and polyvinylpyrrolidone K-90 (K-value=88.0 to 96.0) produced by Wako Pure Chemical Industries, Ltd.

The dispersing agent is generally added in an amount in the range of 0.1 to 20 weight percent, and preferably in the range of 0.3 to 10 weight percent of the acicular substance such as carbon nanotube. When the amount of dispersing agent added is excessively small, dispersibility and dispersion stability are not satisfactorily improved. When the amount of dispersing agent added is excessively large, the dispersing agent may remain in the polyimide tube after baking, resulting in a decrease in the strength.

The dispersion liquid of an acicular substance can be prepared by adding the acicular substance such as carbon nanotube and a dispersing agent to an organic amide solvent, and mixing by stirring the resulting mixture with a stirrer. The solid content of the acicular substance is preferably in the range of 1 to 70 weight percent, and more preferably in the range of 3 to 50 weight percent on a weight basis.

The polyimide varnish can be prepared by a method of adding boron nitride and the dispersion liquid of the acicular substance to a polyimide precursor solution (raw material varnish), blending the resulting mixture with a roll mill, and then mixing the mixture by stirring with a stirrer. Alternatively, a method of blending the raw material varnish with boron nitride with a roll mill, and then adding the dispersion liquid of the acicular substance to the resulting mixture, and mixing the mixture by stirring with a stirrer may be employed. Another method may be employed as long as boron nitride and the acicular substance can be efficiently dispersed into the raw material varnish.

When the method of preparing a polyimide varnish using a dispersion liquid of an acicular substance is employed, dispersibility and dispersion stability of the acicular substance such as carbon nanotube increase. As a result, a polyimide tube having a further improved thermal conductivity can be obtained.

The polyimide tube of the present invention can be used as a base member of a fixing belt installed in a fixing unit in an image-forming apparatus utilizing an electrophotographic method. A fixing belt of the present invention preferably has a structure in which a polyimide tube composed of a polyimide resin composition in which 5 to 23.5 volume percent of boron nitride and 1 to 15 volume percent of an acicular substance are dispersed in a polyimide resin on the basis of the total volume of the composition is used as a belt base member, and a fluorocarbon resin layer is provided on the outer peripheral surface of the belt base member either directly or with an adhesive layer therebetween.

As the fluorocarbon resin forming the fluorocarbon resin layer is preferably a resin having good heat resistance so that the fixing belt can be continuously used at high temperatures. Specific examples thereof include polytetrafluoroethylene (PTFE), tetrafluoroethylene/perfluoroalkyl vinyl ether copolymers (PFA), and tetrafluoroethylene/hexafluoropropylene copolymers (FEP).

The fluorocarbon resin layer can be formed using a pure fluorocarbon resin. However, in order to prevent offset due to electrification, an electrically conductive filler may be incorporated. In the case where the fluorocarbon resin layer is bonded to the polyimide tube with an adhesive therebetween, similarly, an adhesion layer functioning as an interlayer may also contain an electrically conductive filler. The fluorocarbon resin layer is provided so that a mold-releasing property is imparted to the fixing belt and toner particles on a material to be transferred, such as a recording sheet, do not adhered to the surface of the fixing belt. By incorporating an electrically conductive filler in a fluorocarbon resin to impart an electrically conductive property, an offset phenomenon due to electrification can also be prevented.

Examples of the electrically conductive filler include, but are not particularly limited to, electrically conductive carbon black such as Ketjenblack, and powders of metals such as aluminum. The average particle diameter of the electrically conductive filler is preferably 0.5 µm or less in order to achieve a stable and uniform electrically conductive property. The content of the electrically conductive filler is generally in the range of about 0.1 to 5 weight percent. When the content of the electrically conductive filler is increased, the level of the electrically conductive property of the fluorocarbon resin layer becomes excessively high. As a result, electric charges of the toner may flow to the fluorocarbon resin layer, and an attractive force between the material to be transferred and the toner may be decreased.

The fluorocarbon resin layer can be formed by a method of applying a varnish containing a fluorocarbon resin, and conducting baking. As an alternative method, a method of coating a fluorocarbon resin tube may also be employed. The thickness of the fluorocarbon resin layer is generally in the range of 1 to 30 µm, and preferably in the range of 5 to 15 µm.

In order to improve the adhesion property between the polyimide tube and the fluorocarbon resin layer, an adhesion layer may be provided in the fixing belt as an interlayer. An electrically conductive filler may be incorporated in the adhesion layer, as required. From the standpoint of heat resistance, the adhesion layer is preferably made of a heat-resistant resin. The resin constituting the adhesion layer is not particularly limited, but, for example, a mixture of a fluorocarbon resin and a polyamide-imide resin or a mixture of a fluorocarbon resin and a polyethersulfone resin is preferable. When an electrically conductive filler is incorporated in the adhesion layer, a shield effect against frictional electrification on the inner surface of the fixing belt and an effect of preventing electrification on the outer surface are increased, and thus offset can be effectively prevented. As the electrically conductive filler added in the adhesion layer, the same electrically conductive filler as that used in the outer layer can be used. The mixing ratio of the electrically conductive filler is generally in the range of 0.5 to 10 weight percent, and preferably in the range of about 1 to 5 weight percent. The thickness of the adhesion layer is generally in the range of 0.1 to 20 µm, and preferably in the range of about 1 to 10 µm.

The fixing belt of the present invention has a structure in which a fluorocarbon resin layer is provided on the outer peripheral surface of a thermally-cured (imidized) polyimide tube either directly or with an adhesive layer therebetween. In forming the fluorocarbon resin layer, in the case where the fluorocarbon resin is baked at a high temperature, the following method may be employed. In a production process of a polyimide tube, a solidified tube is prepared by drying and removing a solvent, a fluorocarbon resin layer is formed on the solidified tube either directly or with an adhesion layer therebetween, and thermal curing of the polyimide tube and baking of the fluorocarbon resin are then performed at the same time.

Figure 2:
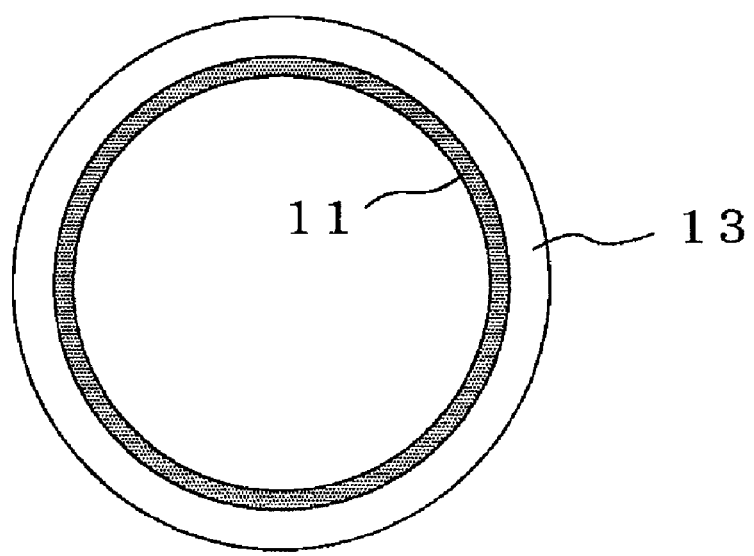
FIG. 2 is a cross-sectional view showing a layer structure of an example of a fixing belt.
Figure 3:
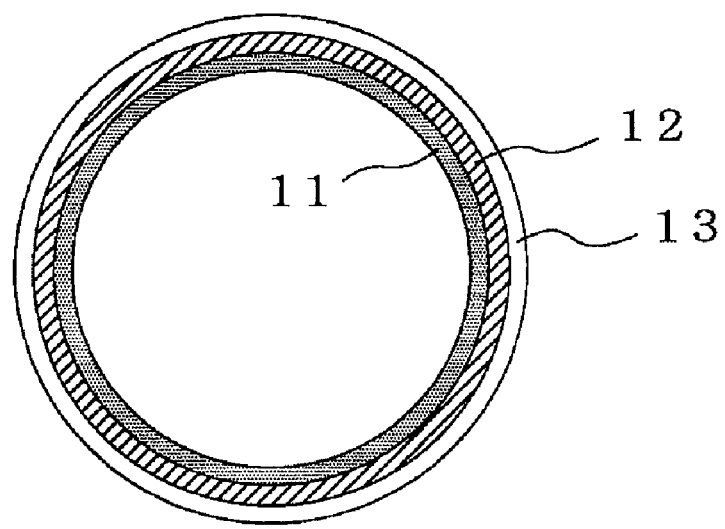
FIG. 3 is a cross-sectional view showing a layer structure of another example of a fixing belt.

As shown in the cross-sectional view of FIG. 2, the fixing belt of the present invention has a two-layer structure in which a fluorocarbon resin layer 13 is provided on the outer peripheral surface of a polyimide tube 11. Alternatively, as shown in FIG. 3, the fixing belt of the present invention has a three-layer structure in which a fluorocarbon resin layer 13 is provided on the outer peripheral surface of a polyimide tube 11 with an adhesive layer 12 therebetween. A resin layer or a rubber layer other than the adhesion layer may be additionally arranged as an interlayer, as needed.

The polyimide tube of the present invention has a good thermal conductivity, high tensile strengths in the circumferential direction and in the axial direction, and a good modulus of elasticity. When the polyimide tube of the present invention is formed by the above-described dispensing method, the mechanical strength in the circumferential direction is increased by orientation of boron nitride and an acicular substance.

The thermal conductivity of the polyimide tube of the present invention is preferably 0.50 W/m·K or more, more preferably 0.52 W/m·K or more, and particularly preferably 0.54 W/m·K or more. The tensile strength in the circumferential direction of the polyimide tube of the present invention is preferably 225 N/mm$^2$ or more, and more preferably 230 N/mm$^2$ or more. The tensile strength in the axial direction of the polyimide tube of the present invention is preferably 208 N/mm$^2$ or more, and more preferably 210 N/mm$^2$ or more. The modulus of elasticity of the polyimide tube of the present invention is preferably 138 N/mm$^2$ or more, and more preferably 140 N/mm$^2$ or more. When the polyimide tube of the present invention is used as a base member of a fixing belt, a fixing belt in which, for example, twist deformation, and cracking and flattening at an end thereof are suppressed can be obtained.

EXAMPLES

The present invention will now be described more specifically using Examples and Comparative Examples. Test methods for evaluating the performances in Examples and Comparative Examples are as follows.

(1) Thermal Conductivity

The thermal diffusivity was measured with a periodic heating method-thermal diffusivity measuring apparatus (FTC-1) produced by ULVAC-RIKO, Inc., and the thermal conductivity was calculated by multiplying the specific heat and the density of a polyimide tube by the measured thermal diffusivity (measurement temperature: 23° C.). The specific heat of the polyimide tube was measured in accordance with JIS K 7112 (the A-method) using an electronic balance AE-240 produced by METTLER (measurement temperature: 23° C.).

(2) Tensile Strength

The tensile strengths of a polyimide tube were measured at two positions in the circumferential direction and in the axial direction using sample pieces cut from the polyimide tube. The tensile strengths of the polyimide tube were measured in accordance with JIS K 7161 using Autograph "AGS-500D" produced by Shimadzu Corporation at a tensile speed of 1.7 mm/s and a distance between chucks of 30 mm.

(3) Modulus of Elasticity

The moduli of elasticity of a polyimide tube were measured at two positions in the circumferential direction and in the axial direction using sample pieces cut from the polyimide tube. The moduli of elasticity of the polyimide tube were measured in accordance with JIS K 7161 using Autograph "AGS-500D" produced by Shimadzu Corporation at a tensile speed of 1.7 mm/s and a distance between chucks of 30 mm. The average of the measured value of the circumferential direction and the measured value of the axial direction is shown as the modulus of elasticity.

Example 1

An aluminum column with an outer diameter φ of 20 mm, the outer surface of which was coated with a ceramic, was used as a core body functioning as a metal mold. A nozzle (discharge opening) attached to a supply portion of a dispenser was brought into contact with the outer surface of the core body while rotating the core body. On the basis of the total volume of the solid content, 10 volume percent of boron nitride ("MBN-010T" produced by Mitsui Chemicals, Inc., graphite structure-type BN, specific gravity: 2.27), and 5 volume percent of carbon nanotube ("VGCF" produced by Showa Denko K.K., diameter φ: 150 nm, length: 8 μm, specific gravity: 2.0) were added to a polyimide varnish used as a raw material ["U-varnish S-301" produced by Ube Industries Ltd., specific gravity: 1.446; a polyimide precursor varnish formed into a polyimide resin having a repeating unit represented by formula (A) above]. The resulting mixture was preliminarily stirred with a stirrer, and mixed with a three-roll mill, and vacuum degassing was then performed. A polyimide varnish containing the above components was obtained.

The polyimide varnish was applied by moving the nozzle at a constant speed in the rotation axis direction of the core body while supplying a constant amount of the polyimide varnish from the nozzle of the supply portion of the dispenser to the outer surface of the core body. A PTFE tube having an inner diameter of 2 mm and an outer diameter of 4 mm was used as the nozzle of the supply portion of the dispenser. The nozzle was brought into contact with the core body at a position 20 mm distant from the right end of the core body, and the supply of the polyimide varnish was started. At the time when the nozzle was moved to a position 20 mm distant from the left end of the core body, the supply of the polyimide varnish was stopped, and the nozzle was detached from the surface of the core body. The core body was heated to 400° C. stepwise while being rotated. After cooling, the solidified applied polyimide resin was detached from the core body as a tube. The polyimide tube thus obtained had a thickness of 50 μm, an outer diameter of 20.15 mm, and a length of 250 mm.

Example 2

A polyimide tube was prepared as in Example 1 except that, in Example 1, the content of the boron nitride was changed to 15 volume percent and the content of the carbon nanotube was changed to 2 volume percent.

Example 3

A polyimide tube was prepared as in Example 1 except that, in Example 1, the content of the boron nitride was changed to 15 volume percent and the content of the carbon nanotube was changed to 3.5 volume percent.

Example 4

A polyimide tube was prepared as in Example 1 except that, in Example 1, the content of the boron nitride was changed to 15 volume percent and the content of the carbon nanotube was changed to 5 volume percent.

Example 5

A polyimide tube was prepared as in Example 1 except that, in Example 1, the content of the boron nitride was changed to 20 volume percent and the content of the carbon nanotube was changed to 2 volume percent.

Example 6

A polyimide tube was prepared as in Example 1 except that, in Example 1, the content of the boron nitride was changed to 20 volume percent and the content of the carbon nanotube was changed to 3.5 volume percent.

Comparative Example 1

A polyimide tube was prepared as in Example 1 except that, in Example 1, the content of the boron nitride was changed to 25 volume percent and the content of the carbon nanotube was changed to 0 volume percent.

Comparative Example 2

A polyimide tube was prepared as in Example 1 except that, in Example 1, the content of the boron nitride was changed to 20 volume percent and the content of the carbon nanotube was changed to 0 volume percent.

Comparative Example 3

A polyimide tube was prepared as in Example 1 except that, in Example 1, the content of the boron nitride was changed to 30 volume percent, and the content of the carbon nanotube was changed to 0 volume percent.

The viscosities of the polyimide varnishes of Examples 1 to 6 and Comparative Examples 1 to 3 measured with a B-type viscometer under the conditions of a liquid temperature of 25° C. and a number of rotations of a rotor of 6 rpm were in the range of about 500 to 3,000 poise. The results are shown in Table I.

TABLE I

|  | Boron nitride (vol. %) | Carbon nanotube (vol. %) | Thermal conductivity (W/m · K) | Tensile strength (Circumferential direction) (N/mm$^2$) | Tensile strength (Axial direction) (N/mm$^2$) | Modulus of elasticity (N/mm$^2$) |
|---|---|---|---|---|---|---|
| Example 1 | 10 | 5 | 0.55 | 261 | 240 | 139 |
| Example 2 | 15 | 2 | 0.54 | 260 | 252 | 140 |
| Example 3 | 15 | 3.5 | 0.55 | 250 | 231 | 140 |
| Example 4 | 15 | 5 | 0.60 | 239 | 227 | 140 |
| Example 5 | 20 | 2 | 0.54 | 256 | 212 | 141 |
| Example 6 | 20 | 3.5 | 0.61 | 241 | 210 | 141 |
| Comparative Example 1 | 25 | — | 0.54 | 221 | 207 | 139 |
| Comparative Example 2 | 20 | — | 0.51 | 235 | 207 | 137 |
| Comparative Example 3 | 30 | — | 0.58 | 210 | 203 | 143 |

In the case where the content of the boron nitride was 25 volume percent (Comparative Example 1), the thermal conductivity was good, but the tensile strengths were low, in particular, the tensile strength in the circumferential direction was insufficient. In the case where the content of the boron nitride was 20 volume percent (Comparative Example 2), the thermal conductivity tended to decrease. In the case where the content of the boron nitride was 30 volume percent (Comparative Example 3), the thermal conductivity was good, but the tensile strengths were low.

In contrast, the polyimide tubes of the present invention had good thermal conductivity, and in addition, high levels of tensile strengths and modulus of elasticity in tension. In particular, the tensile strength in the circumferential direction tended to be higher than the tensile strength in the axial direction. As described above, according to the present invention, by using boron nitride and an acicular substance such as carbon nanotube in combination, a polyimide tube having highly-balanced properties and a high mechanical strength in the circumferential direction can be obtained.

Example 7

A polyimide tube was prepared as in Example 2 except that, instead of "U-varnish S-301" produced by Ube Industries Ltd., a raw material varnish prepared by mixing "U-varnish S-301" with "U-varnish A" [a polyimide precursor varnish formed into a polyimide resin having a repeating unit represented by formula (B) above] at a weight ratio of 10:90 in terms of the solid content was used as the polyimide varnish of the raw material. The thermal conductivity, the tensile strength in the circumferential direction, the tensile strength in the axial direction, and the modulus of elasticity of the prepared polyimide tube showed the same level as that of Example 2.

Example 8

A polyimide tube was prepared as in Example 2 except that, instead of "U-varnish S-301" produced by Ube Industries Ltd., a raw material varnish prepared by mixing "U-varnish S-301" with "Pyre ML RC-5019" [a polyimide precursor varnish formed into a polyimide resin having a repeating unit represented by formula (C) above] produced by Industrial Summit Technology (I.S.T) Corporation at a weight ratio of 10:90 in terms of the solid content was used as the polyimide varnish of the raw material. The thermal conductivity, the tensile strength in the circumferential direction, the tensile strength in the axial direction, and the modulus of elasticity of the prepared polyimide tube showed the same level as that of Example 2.

Example 9

A precursor solution of a polyimide copolymer (raw material polyimide varnish) was prepared by dissolving 408 g of 3,3',4,4'-diphenyltetracarboxylic dianhydride, 112.5 g of p-phenylenediamine, and 69.4 g of 4,4'-diaminodiphenyl ether in 3,000 mL of N-methyl-2-pyrrolidone, and stirring the resulting mixture under a nitrogen stream at a temperature of 20° C. or lower for five hours. A polyimide tube was prepared as in Example 2 except that, in Example 2, instead of "U-varnish S-301" produced by Ube Industries Ltd., the above raw material polyimide varnish was used. The thermal conductivity, the tensile strength in the circumferential direction, the tensile strength in the axial direction, and the modulus of elasticity of the prepared polyimide tube showed the same level as that of Example 2.

Example 10

In Example 2, after a coating layer of the polyimide varnish was formed on the surface of the core body by a dispensing method, and thermal curing (imidization) was performed in that state. Instead of this method, in this Example, a coating layer was heated from 100° C. to 200° C. stepwise to remove a solvent, thus forming a solidified polyimide layer. An adhesion layer was formed on this polyimide layer by a dipping method using a primer containing 3 weight percent of electrically conductive carbon black. A resin forming the adhesion layer was a dispersion (produced by Du Pont Japan Limited, Product No. 855-003) composed of a mixture containing a polyamide-imide, PTFE, PFA, and the like.

Subsequently, a mixture prepared by blending 0.7 weight percent of electrically conductive carbon black with a fluorocarbon resin dispersion (produced by Du Pont Japan Limited, Product No. 855-405) was applied onto the adhesion layer to form a fluorocarbon resin layer. The polyimide layer and the fluorocarbon resin layer were baked at 400° C., and the core body was then pulled out, thus obtaining a fixing belt. Regarding the thicknesses of the layers of the prepared fixing belt, the thickness of the polyimide resin layer was 50 μm, the thickness of the adhesion layer was 5 μm, and the thickness of the fluorocarbon resin layer was 10 μm.

A fixing unit composed of the above fixing belt and a pressure roller was installed in a fixing unit of a commercially available electrophotographic copy machine (the number of sheets printed: 15 sheets/min). As a result of a successive printing of 30,000 sheets, a problem such as twist deformation of the fixing belt, or cracking or flattening at an end thereof was not observed.

Example 11

A raw material varnish prepared by mixing "U-varnish S-301" produced by Ube Industries Ltd. with "Pyre ML RC-5019" produced by I.S.T Corporation at a weight ratio of 10:90 in terms of the solid content was used as a polyimide varnish of the raw material.

On the basis of the total volume of the solid content, 20 volume percent of boron nitride ("MBN-010T" produced by Mitsui Chemicals, Inc.) and 5 volume percent of carbon nanotube ("VGCF" produced by Showa Denko K.K.) were added to the raw material varnish. The resulting mixture was preliminarily stirred with a stirrer, and mixed with a three-roll mill, and vacuum degassing was then performed. A polyimide varnish was thus prepared.

A polyimide tube was prepared as in Example 1 except that the above polyimide varnish was used. The results are shown in Table II.

Example 12

Carbon nanotube ("VGCF" produced by Showa Denko K.K.) and a macromolecular dispersing agent ["AJISPER PB-711" produced by Ajinomoto Fine-Techno Co., Inc.; a copolymer containing a basic functional group] were added to N-methyl-2-pyrrolidone so that the ratio of the dispersing agent to the carbon nanotube was 3 weight percent. The resulting mixture was stirred with a stirrer to prepare a carbon nanotube dispersion liquid.

Boron nitride ("MBN-010T" produced by Mitsui Chemicals, Inc.) was added to the same raw material varnish as that used in Example 11. The resulting mixture was mixed with a three-roll mill, and the carbon nanotube dispersion liquid was then blended with a stirrer to prepare a polyimide varnish.

This polyimide varnish contained "U-varnish S-301" and "Pyre ML RC-5019" at a solid content weight ratio of 10:90, and contained 20 volume percent of boron nitride and 5 volume percent of carbon nanotube on the basis of the total volume of the solid content.

A polyimide tube was prepared as in Example 1 except that the above polyimide varnish was used. The results are shown in Table II.

Example 13

A carbon nanotube dispersion liquid was prepared as in Example 12 except that, in Example 12, the macromolecular dispersing agent was changed from "AJISPER PB-711" to "polyvinylpyrrolidone K-90" [K-value (a viscosity characteristic value related to the molecular weight)=88.0 to 96.0] produced by Wako Pure Chemical Industries, Ltd.

A polyimide varnish was prepared as in Example 12 except that this carbon nanotube dispersion liquid was used. Subsequently, a polyimide tube was prepared using the polyimide varnish. The results are shown in Table II.

TABLE II

|  | Boron nitride (vol. %) | Carbon nanotube (vol. %) | Thermal conductivity (W/m · K) | Tensile strength (Circumferential direction) (N/mm$^2$) | Tensile strength (Axial direction) (N/mm$^2$) | Modulus of elasticity (N/mm$^2$) |
|---|---|---|---|---|---|---|
| Example 11 | 20 | 5 | 0.62 | 251 | 250 | 142 |
| Example 12 | 20 | 5 | 0.74 | 240 | 232 | 139 |
| Example 13 | 20 | 5 | 0.75 | 242 | 238 | 141 |

As is apparent from the results shown in Table II, when polyimide tubes were prepared using polyimide varnishes having the same composition, the thermal conductivities of the polyimide tubes produced by using a polyimide varnish prepared by adding boron nitride and a carbon nanotube dispersion liquid to a raw material warmish, and mixing the resulting mixture by stirring (Examples 12 and 13) were higher than the thermal conductivity of the polyimide tube produced by using a polyimide varnish prepared by adding boron nitride and carbon nanotube to a raw material warmish, and mixing the resulting mixture by stirring (Example 11).

INDUSTRIAL APPLICABILITY

The polyimide tube of the present invention has a high thermal conductivity, and in addition, a good tensile strength and modulus of elasticity, and thus exhibits good properties as a base member of a fixing belt arranged in a fixing unit of an image-forming apparatus utilizing an electrophotographic method. Accordingly, the polyimide tube of the present invention can be used as a base member of a fixing belt.

The invention claimed is:

1. A polyimide tube comprising:

a polyimide resin composition in which 5 to 23.5 volume percent of boron nitride and 1 to 15 volume percent of an acicular substance are dispersed as a filler in a polyimide resin on the basis of the total volume of the composition, wherein the polyimide resin composition is a composition in which the boron nitride and the acicular substance are dispersed in the polyimide resin in amounts by volume percent satisfying the relationship represented by formula (1):

$$15 \leq x+3y \leq 55 \qquad (1)$$

wherein x represents the volume percent of the boron nitride, and y represents the volume percent of the acicular substance.

2. The polyimide tube according to claim 1, wherein the boron nitride is hexagonal boron nitride having a graphite structure, cubic boron nitride having a cubic crystal structure, or a mixture thereof.

3. The polyimide tube according to claim 1, wherein the boron nitride has an average particle diameter in the range of 0.1 to 15 μm measured by a laser scattering method.

4. The polyimide tube according to claim 1, wherein the acicular substance is at least one acicular filler selected from the group consisting of carbon nanotube, titanium oxide, zinc oxide, potassium titanate, aluminum borate, silicon carbide, silicon nitride, magnesium sulfate, calcium silicate, calcium carbonate, and graphite.

5. The polyimide tube according to claim 1, wherein the acicular substance has a length in the range of 0.1 to 200 μm and a diameter in the range of 0.01 to 10 μm.

6. The polyimide tube according to claim 1, wherein the acicular substance is carbon nanotube.

7. The polyimide tube according to claim 1, wherein the polyimide resin is at least one polyimide resin selected from the group consisting of:

a polyimide resin A having a repeating unit represented by formula (A):

[Chem. 14]

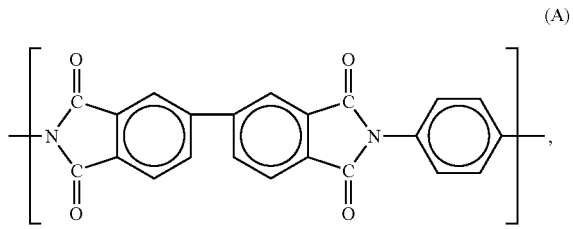

(A)

a polyimide resin B having a repeating unit represented by formula (B):

[Chem. 15]

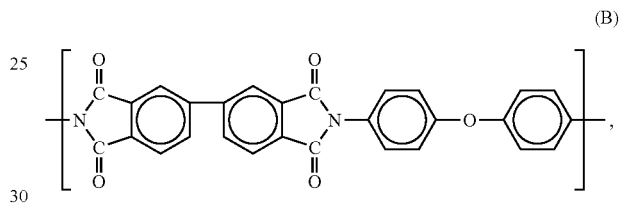

(B)

and a polyimide resin C having a repeating unit represented by formula (C):

[Chem. 16]

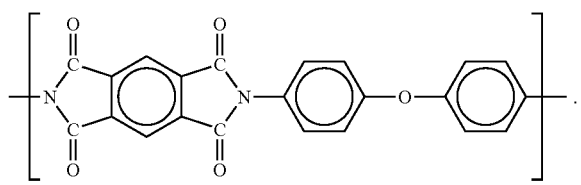

(C)

8. The polyimide tube according to claim 1, wherein the polyimide resin is at least one polyimide copolymer selected from the group consisting of:

(1) a polyimide copolymer 1 having a repeating unit represented by formula (A):

[Chem. 17]

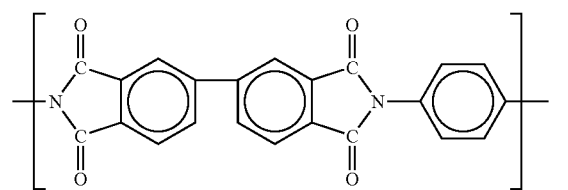

(A)

and a repeating unit represented by formula (B):

[Chem. 18]

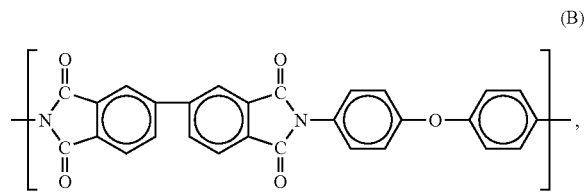

(B)

(2) a polyimide copolymer 2 having a repeating unit represented by formula (D):

[Chem. 19]

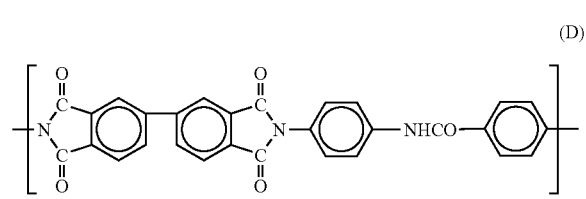

(D)

and a repeating unit represented by formula (B):

[Chem. 20]

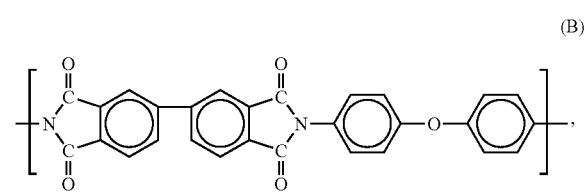

(B)

(3) a polyimide copolymer 3 having a repeating unit represented by formula (E):

[Chem. 21]

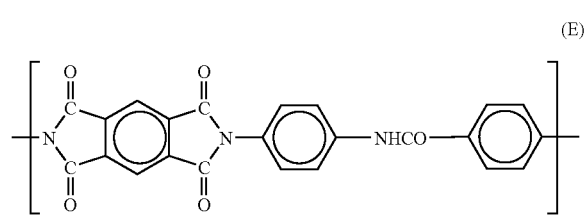

(E)

and a repeating unit represented by formula (C):

[Chem. 22]

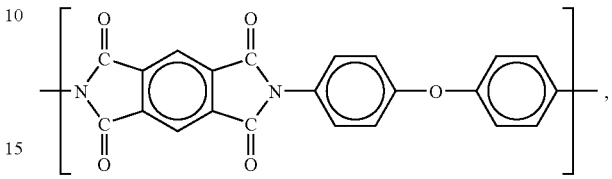

(C)

(4) a polyimide copolymer 4 having a repeating unit represented by formula (A):

[Chem. 23]

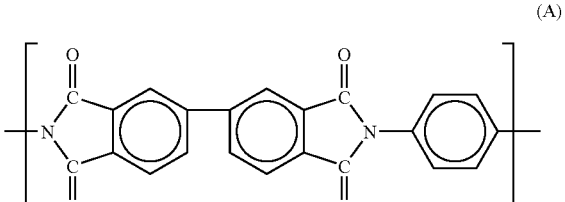

(A)

and a repeating unit represented by formula (F):

[Chem. 24]

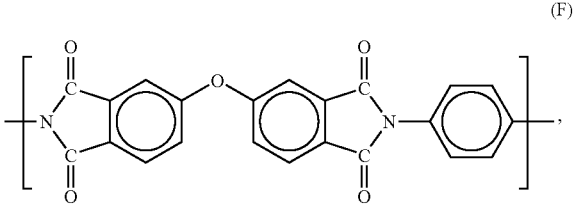

(F)

and (5) a polyimide copolymer 5 having a repeating unit represented by formula (A):

[Chem. 25]

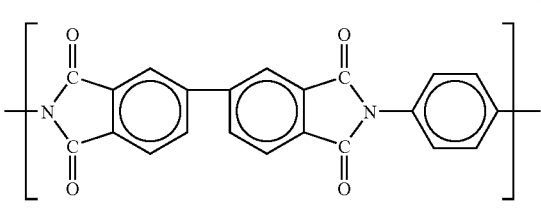

(A)

and a repeating unit represented by formula (G):
[Chem. 26]
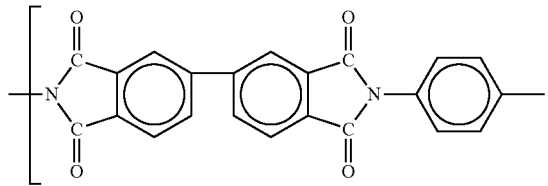
(G)
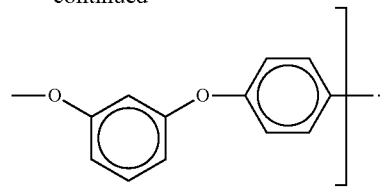
9. A fixing belt comprising the polyimide tube according to claim 1 as a belt base member, wherein the fixing belt has a layer structure in which a fluorocarbon resin layer is provided on an outer peripheral surface of the belt base member either directly or with an adhesion layer therebetween.
* * * * *